(12) United States Patent
From (10) Patent No.: US 8,845,297 B2
(45) Date of Patent: Sep. 30, 2014

(54) METHOD, ASSEMBLY AND SYSTEM FOR MOUNTING WIND TURBINE BLADES TO A WIND TURBINE HUB

(75) Inventor: Bo From, Ikast (DK)

(73) Assignee: Siemens Aktiengesellschaft, Munich (DE)

( * ) Notice: Subject to any disclaimer, the term of this patent is extended or adjusted under 35 U.S.C. 154(b) by 387 days.

(21) Appl. No.: 13/228,137

(22) Filed: Sep. 8, 2011

(65) Prior Publication Data

US 2012/0076663 A1    Mar. 29, 2012

(30) Foreign Application Priority Data

Sep. 27, 2010 (EP) .................................... 10180125

(51) Int. Cl.
  *F03D 11/04* (2006.01)
  *F03D 1/06* (2006.01)
  *F03D 1/00* (2006.01)

(52) U.S. Cl.
  CPC .............. *F03D 1/001* (2013.01); *F03D 1/0658* (2013.01); *Y02E 10/728* (2013.01); *F03D 1/005* (2013.01); *Y02E 10/721* (2013.01); *F05B 2230/61* (2013.01)
  USPC ...................................................... 416/244 R

(58) Field of Classification Search
  USPC .......... 416/142, 244 R, DIG. 6; 29/889, 889.1
  See application file for complete search history.

(56) References Cited

U.S. PATENT DOCUMENTS

| 7,207,777 B2 * | 4/2007 | Bervang ......................... 416/119 |
| 2008/0296197 A1 | 12/2008 | Kootstra |
| 2010/0313417 A1 * | 12/2010 | Lebon et al. .................... 29/888 |
| 2012/0195768 A1 * | 8/2012 | Van Nood et al. ......... 416/244 R |
| 2013/0236316 A1 * | 9/2013 | Bitsch et al. .............. 416/204 R |

FOREIGN PATENT DOCUMENTS

| DE | 3405091 A1 * | 8/1985 |
| DE | 102008053404 A1 | 4/2010 |
| EP | 1925582 A1 | 5/2008 |
| EP | 2003333 A1 | 12/2008 |
| EP | 2275669 A2 | 1/2011 |

OTHER PUBLICATIONS

Graeber, Wind-energy Generator, Aug. 14, 1985, Abstract of DE 3405091 A1.*

* cited by examiner

*Primary Examiner* — Ned Landrum
*Assistant Examiner* — Liam McDowell (57) ABSTRACT

An assembly for mounting wind turbine blades to a wind turbine hub is disclosed. Such assembly includes a blade retaining arrangement to accommodate at least two blades and an interface to a lifting device for lifting the assembly to the hub. Furthermore, a system and a method for the same purpose are disclosed.

14 Claims, 6 Drawing Sheets

METHOD, ASSEMBLY AND SYSTEM FOR MOUNTING WIND TURBINE BLADES TO A WIND TURBINE HUB

CROSS REFERENCE TO RELATED APPLICATIONS

This application claims priority of European Patent Office application No. 10180125.6 EP filed Sep. 27, 2010, which is incorporated by reference herein in its entirety.

FIELD OF THE INVENTION

The invention relates to a method for mounting wind turbine blades to a wind turbine hub. The invention further relates to an assembly and to a system for mounting wind turbine blades to a wind turbine hub.

BACKGROUND OF THE INVENTION

Wind turbine usually comprise at least the following principal components: a tower, a nacelle, a generator and a rotor comprising a hub and wind turbine blades. The nacelle is placed on top of the tower and the generator is situated inside the nacelle. The rotor is connected to the generator by means of a drive train.

In recent years, the construction of wind turbines has become more and more of a challenging task due to the general tendency to considerably increase sizes and weights of modern wind turbines. Mounting a wind turbine may usually include transporting wind turbine components to a site of construction, assembling a tower, lifting and mounting a nacelle with a generator to the tower, assembling a rotor on the ground, i.e. mounting wind turbine blades to the hub, and lifting and mounting the assembled rotor to the nacelle. For lifting these wind turbine components mobile cranes can be applied.

EP 2003333 A1 discloses one such method of mounting wind turbine components. According to this method, blades are mounted to a hub on the ground using a reach stacker and the assembled rotor is then lifted to a nacelle. However, such method has several drawbacks. Assembling the rotor on the ground can be difficult since it requires a large, clear and stable area in order to provide for suitable conditions for workers and the devices applied. In addition, lifting the assembled rotor to the nacelle is a complicated procedure since, besides an enormous size and weight of the rotor, it has to be rotated from a horizontal into a vertical position during lifting. A horizontal position of the rotor would mean that the rotor blades are orientated essentially horizontally, i.e. parallel to the whereas the vertical position is again defined by the essentially vertical orientation of the rotor blades.

An alternative method of mounting a wind turbine rotor to a nacelle is disclosed in EP 1925582 A1. This method includes mounting blades to a hub which has already been mounted to the nacelle before. The orientation of a blade is kept substantially horizontal when it is lifted off the ground and mounted to the hub through a corresponding empty blade hole on the hub. After mounting the first blade the hub is turned, so that a next blade, which again is lifted substantially horizontally, can be mounted to a next empty blade hole on the hub. The process is repeated until the last blade has been lifted and mounted to the hub. Apart from other drawbacks, this method has the disadvantage that it cannot be applied when it is not possible to turn the hub during the mounting process, e.g. when no or little electrical power is available during the installation to turn the hub.

SUMMARY OF THE INVENTION

It is therefore an object of the invention to provide an improved possibility of how to mount wind turbine blades to a wind turbine hub, preferably also in cases in which it is not possible to turn the hub during the mounting process.

The object of the invention is achieved by an assembly for mounting wind turbine blades to a wind turbine hub, a system for mounting wind turbine blades to a wind turbine hub, and by a method for mounting wind turbine blades to a wind turbine hub.

The assembly for mounting wind turbine blades to a wind turbine hub according to the invention comprises a blade retaining arrangement to accommodate at least two blades and an interface to a lifting device for lifting the assembly to the hub. The blade retaining arrangement may comprise a number of blade retaining elements, each constructed to hold at least one blade. Such blade retaining arrangement may be made up in a very simple manner, e.g. by comprising only one compartment in which several blades can be accommodated. In the other extreme, it can be made up of numerous mechanical elements joined together so that movement of such elements and thus of the individual blades are made possible. Detailed examples of such blade retaining arrangements will be given below. The interface may comprise a hook or a lug by which it can be attached to a crane or a similar lifting device. Such hook may be adjusted in position by using wire winches or similar adjustment means.

The effect of such an assembly—be it made up in a very simple manner or be it a sophisticated system—is always that several blades can be mounted to the hub of the wind turbine at one given time. Therefore, less time is consumed during the lifting process and less effort is needed on the ground as well as up at the level of the hub. At least two blades, preferably all the blades, can all be accommodated in the blade retaining arrangement during one accommodation process on the ground, there is only one lifting procedure necessary and then several blades are ready at hand up at hub level. One can imagine that for instance the time consumed during the lifting process for blades of a rotor comprising three blades altogether can be reduced to about half time while the assembly at hub level can still be carried out at about the same time as before or—depending on the level of sophistication of the assembly—even faster than before.

The system for mounting wind turbine blades to a wind turbine hub according to the invention comprises the assembly described above and a lifting device for lifting the assembly to the wind turbine hub, e.g. a mobile crane, a crane attacked to a wind turbine tower, or a helicopter. The assembly according to the invention may be permanently connected to the lifting device so that the system according to the invention is a uniform unit. However, the assembly may also be non-permanent, i.e. only assembled for the temporary purpose of mounting the blades to the wind turbine, while after such process the assembly will be detached from the lifting device so that the lifting device can be used for lifting other loads in the course of the assembly of the rest of the wind turbine.

In the corresponding method for mounting wind turbine blades to a wind turbine hub the assembly according to the invention can be used. To carry out a process according to this method, the wind turbine hub is already positioned in a designated operating height of the wind turbine. The method comprises the following steps: at least two blades are first attached to a blade retaining arrangement of an assembly. Further, the assembly with the blades is lifted to the wind turbine hub using a lifting device. Finally, the blades are mounted to the wind turbine hub.

In such a process all blades can be lifted in one operation, which decreases the time needed to operate a crane, thus reducing costs and effort.

Particularly advantageous embodiments and features of the invention are given by the dependent claims, as revealed in the following description. Thereby, features revealed in the context of the assembly may also be realized in the context of the method and vice versa.

In a preferred embodiment of the assembly the blade retaining arrangement comprises at least two blade retaining elements wherein each of the blade retaining elements is constructed such that a blade can be detachably attached to the blade retaining element. This implies that the blades need not be accommodated together in one space but can be spaced apart, preferably such that their position within the assembly corresponds with a designated mounting position at the hub. This means for example that if three blades are to be mounted onto the hub at 120° from each other, a preferred arrangement of the blade retaining elements would be to have three blade retaining elements which are also arranged at 120° from each other. This way mounting the blades at the hub level is made easier.

In accordance with this preferred embodiment of the assembly, the method according to the invention comprises a step in which each blade is attached to a blade retaining element of the blade retaining arrangement.

In another preferred embodiment of the assembly the blade retaining elements are connected to each other by means of at least one hinge, so that they are movable relative to each other. The blade retaining arrangement may also comprise a frame, whereby the blade retaining elements are each connected to the frame by means of a hinge. The frame can thus function as a central part of the assembly. It can be constructed as a yoke. Each of the blade retaining elements can be hingedly connected to the frame such that the blade retaining elements are pivotable relative to the frame. In addition, each blade retaining element can be constructed such that a blade can be detachably attached to the blade retaining element. A lifting hook can be attached to the frame as an interface to a lifting device, which hook is pivotable relative to the frame.

For holding a blade firmly in a blade retaining element different solutions are possible. Use can be made of mechanical, electrical or hydraulic holding means for holding the blade and also of such holding means which are based on more than one of these principles but rather on a combination thereof. Which kind of holding means is chosen mainly depends on the shape and material of the blades, but may also be chosen according cording to other criteria: For instance, a hydraulic activation of holding means needs a hydraulic system for providing hydraulic pressure. Thus a hydraulic holding means is preferred in such case when such hydraulic system is readily available, for instance as a component of the lifting device. The same applies to electrical systems, whereas mechanical systems need no additional supplies from elsewhere and can therefore be used more universally.

According to an embodiment of the invention, a blade retaining element comprises a clamp, in which a blade is held. The blade can be held or squeezed at its root end region, i.e. the area where it changes shape from cylindrical to flat, for more stability. The clamps can be developed to hold individual blade types. They may be constructed as a cage with two halves interconnected by a clamp hinge. These two halves can be pivotable relative to each other through the clamp hinge. A blade can thus be attached and held within the clamp which is easy to open and close.

Such a blade retaining element with a clamp can further comprise slide bearings for bearing the clamp, or, more general, a guiding means for guiding a blade towards the hub. Those guiding means enables the clamp to be slidable within the retaining element. The guiding direction can be parallel to a longitudinal axis of the retaining element, i.e. the longitudinal axis of a blade when fastened within the blade retaining element. This feature can be used for guiding a blade into a corresponding hub hole during a mounting process: this way the blade can be guided to the hub by sliding the clamp using the guiding means.

Operating a blade retaining element, e.g. pivoting or folding out the blade retaining element relative to a frame can be realized by using a mechanical and/or electrical and/or hydraulic moving means for moving one of the blade retaining elements relative to another blade retaining element and/or relative to the frame. As for the choice of activation technology of the moving means, this is again based on the same considerations as outlined above concerning the holding means.

Preferably, the blade retaining element is pivotable between a first position and a second position relative to the assembly itself. The first position of the blade retaining element can correspond to a substantially horizontal position of the blade (as defined above in the introductory section) while the second position of the blade retaining element can correspond to a substantially vertical position of the blade. Any other position between substantially horizontal and substantially vertical positions may also be available, however it is particularly advantageous if the blade retaining elements can be locked in at least one of these two positions (preferably in both) so that they do not get out of a predefined designated position in at a moment at which this is not desired. In a horizontal position it is particularly easy to connect the blades to the blade retaining elements whereas the vertical position corresponds to that orientation of the blades which is needed during their mounting onto the hub.

The method according to the invention thus can be characterized in this context as follows:

The blade retaining elements are connected to each other by means of at least one hinge. Each blade is attached to a blade retaining element. The assembly is lifted to the wind turbine hub using a lifting device. The blade retaining elements are pivoted from a first position to a second position. The blades are guided towards the hub and then mounted to the hub.

In the context of the method according to the invention each of the blades is therefore preferably detachably attached to a corresponding blade retaining element of the blade retaining arrangement and most preferably assured mechanically against falling out. In this position the blades can be arranged in the assembly in a so-called "revolver position" (i.e. similar to bullets in a revolver, which means essentially parallelly aligned). As a next step the assembly is lifted to the wind turbine hub using a lifting device, e.g. a mobile crane. The lifting device is hooked at the lifting hook of the assembly. The lifting hook can be adjusted using wire winches. While the assembly is hanging at the height level of the hub, one of the blade retaining elements is pivoted from a first position to a second position. It can be the upper or top blade retaining element holding a blade (12 o'clock blade), which is brought in a mounting position after pivoting the blade retaining element. As a further step the blade is guided towards the hub into a corresponding hub hole and mounted to the hub. The steps of pivoting, guiding and mounting are repeated for the remaining blade retaining elements until all blades are mounted to the hub. Finally the mounting assembly can be lowered to the ground.

During the method or process of mounting the wind turbine blades the pivoting of a blade retaining element from a first position to a second position can be performed before lifting the mounting assembly to the wind turbine hub. That means that pivoting of at least one blade retaining element from the first position into the second position precedes the step of lifting the assembly to the wind turbine hub. Preferably the blade retaining element which is pivoted before lifting the assembly is a top blade retaining element holding a 12 o'clock blade. After pivoting, the corresponding blade can then be placed in a vertical position. Lifting the assembly in such a position is easier, since it gives more space for a crane hook. After lifting the assembly and mounting the first blade, the wind turbine can be used as a stable point to unfold the other blades. This is advantageous since the centre of gravity of the assembly cannot move during the process whereas operating would be difficult with the assembly hanging in the crane hook. It is also possible to unfold two blades on the ground before lifting at low wind rates.

According to a particularly preferred embodiment of the invention, the hub is not rotated during the mounting of the blades. This means that it is constantly held in one particular mounting position, i.e. rotation position for mounting all blades. In such case, there is no need for a special equipment, e.g. a motor and a gear, directly or indirectly attached to a main shaft of the hub to turn the hub. This is also especially useful for gearless, direct drive wind turbines with a generator having permanent magnets and where no or little electrical power is available during the installation.

Other objects and features of the present invention will become apparent from the following detailed descriptions considered in conjunction with the accompanying drawings. It is to be understood, however, that the drawings are designed solely for the purposes of illustration and not as a definition of the limits of the invention.

In the drawings, like reference numbers refer to like objects throughout. Objects in the diagrams are not necessarily drawn to scale.

DETAILED DESCRIPTION OF THE INVENTION

FIGS. 1 to 6 show an embodiment of the blade mounting assembly 10 according to the invention with three blades 20 which are to be mounted to a wind turbine hub (not shown).

Figure 1:
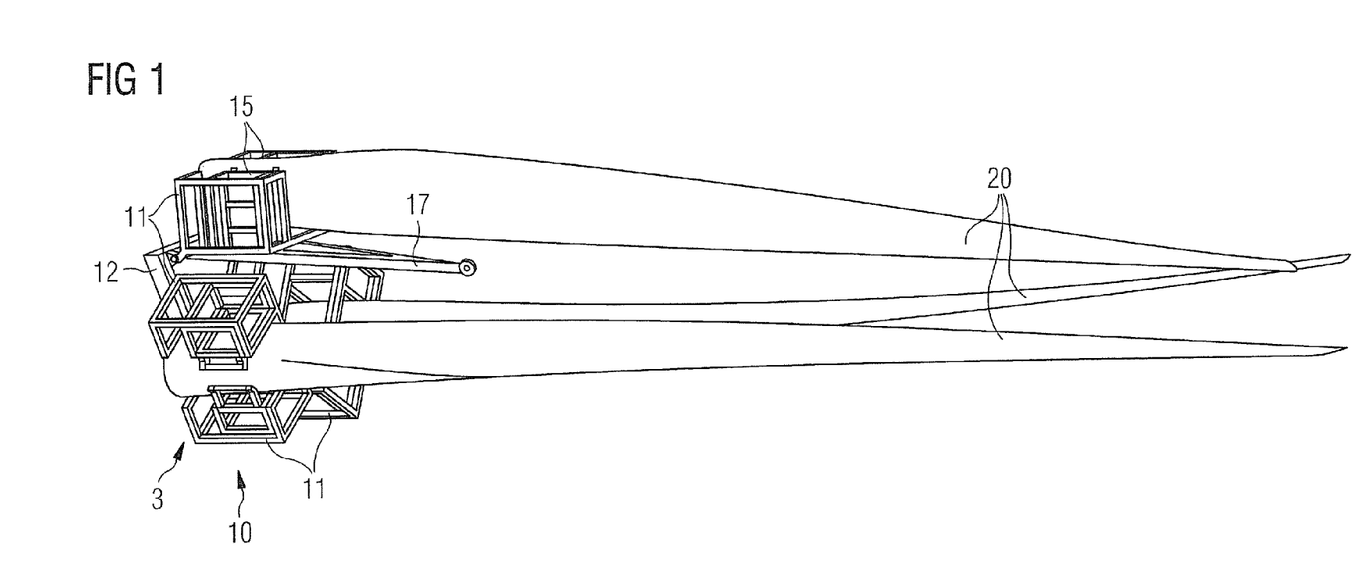
FIG. 1 shows an embodiment of a blade mounting assembly with blades according to an embodiment of the invention in a first position.

As for FIG. 1, the assembly 10 comprises a frame 12 and a blade retaining arrangement 3 comprising three blade retaining elements 11. The blade retaining elements 11 are connected to the frame 12 by means of hinges (cf. FIGS. 5 and 6), such that the blade retaining elements 11 are pivotable relative to the frame 12. Each blade retaining element 11 comprises a clamp 15, in between which a blade 20 is held during the mounting process. The clamps 15 comprise interconnecting means (not shown) for mechanically locking or holding the root end part of each blade 20, i.e. that end part of the blade 20 which is to be connected with the hub. These interconnecting means are actuated by mechanical means. Also electrical and/or hydraulic means can be used, depending on the resources and operation circumstances as outlined above.

Each blade retaining element 11 comprises slide bearings 18 for bearing a corresponding clamp 15 within the blade retaining element 11.

In FIG. 1 there is shown a first position P1 of the assembly 10 in which all blade retaining elements 11 are pivoted in a direction going essentially from left to right in the drawing. Therefore the blades 20 are also all orientated longitudinally in this direction. In such a position, which can be characterized as a revolver position, lifting the assembly 10 is easier than if all blades retaining elements 11 where pivoted along the hinges into positions which resemble their final assembly position, i.e. with the blades 20 being arranged in a star-like manner at an angle of 120° from each other. In order to be able to lift the assembly 20, a hook 17 is also hingedly attached to the frame 12.

Figure 2:
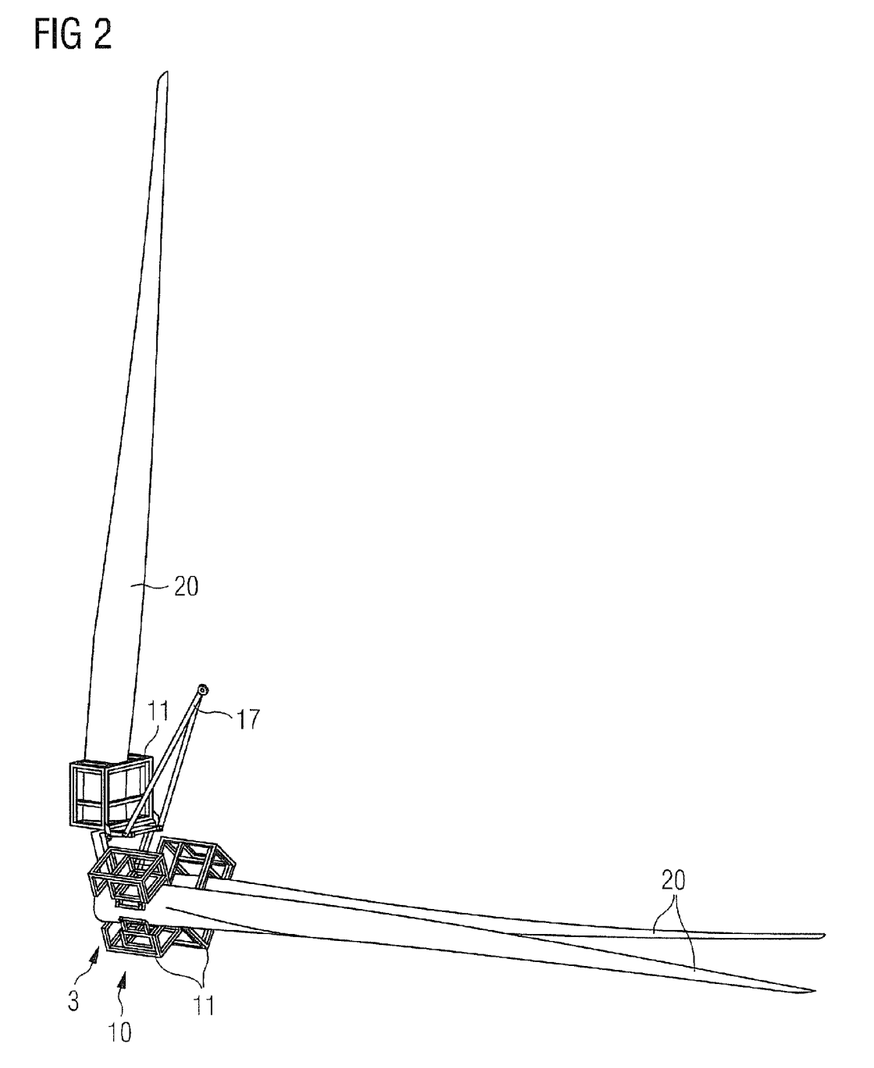
FIG. 2 shows the same assembly in a second position.

FIG. 2 shows the assembly 10 in a second position P2. One of the blades 20, namely the top blade or so-called 12 o'clock blade has been pivoted around the axis of the hinge of its blade retaining element 11. That means that the 12 o'clock blade 20 stands up into the air in an upright position. The other two blades 20 remain as they were in position P1 shown in FIG. 1. It can also be seen that the hook 17 has been lifted into a slightly less upright position so that it projects away from the other two blades 20 and also in a slight angle from the 12 o'clock blade 20 which stands upright. A hook of a crane (not shown) can thus easily be attached to the hook 17 so that the assembly 10 can be lifted by the crane.

It may be noted that pivoting or folding out the blade retaining elements 11 can be implemented by mechanical, electrical and/or hydraulic means according to the criteria described above in more detail.

Figure 3:
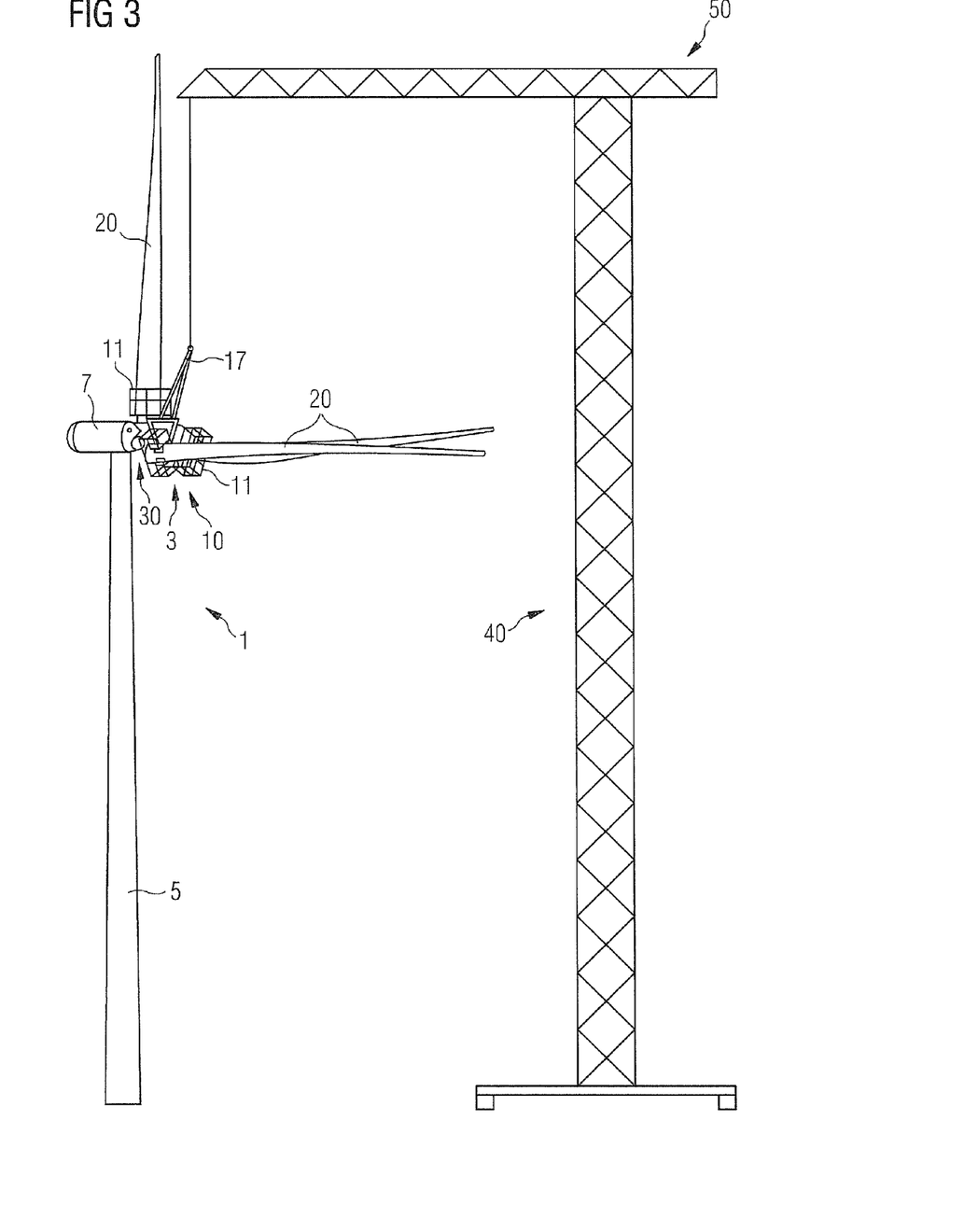
FIG. 3 shows a wind turbine with the assembly of FIGS. 1 and 2 in the second position.

FIG. 3 shows the assembly 10 in the second position P2 as in FIG. 2 while being lifted by a crane 40. The assembly 10 together with the train form a system 50 for mounting the blades 20 to a hub 30 of a wind turbine 1. The hook 17 functions as the interface 17 to the crane 40. The assembly 10 is now on the level of the hub 30 to which the blades 20 are to be attached. Overall, the wind turbine 1 comprises a tower 5 on which there rests a nacelle 7 at one longitudinal end of which there is attached the hub 30.

Figure 4:
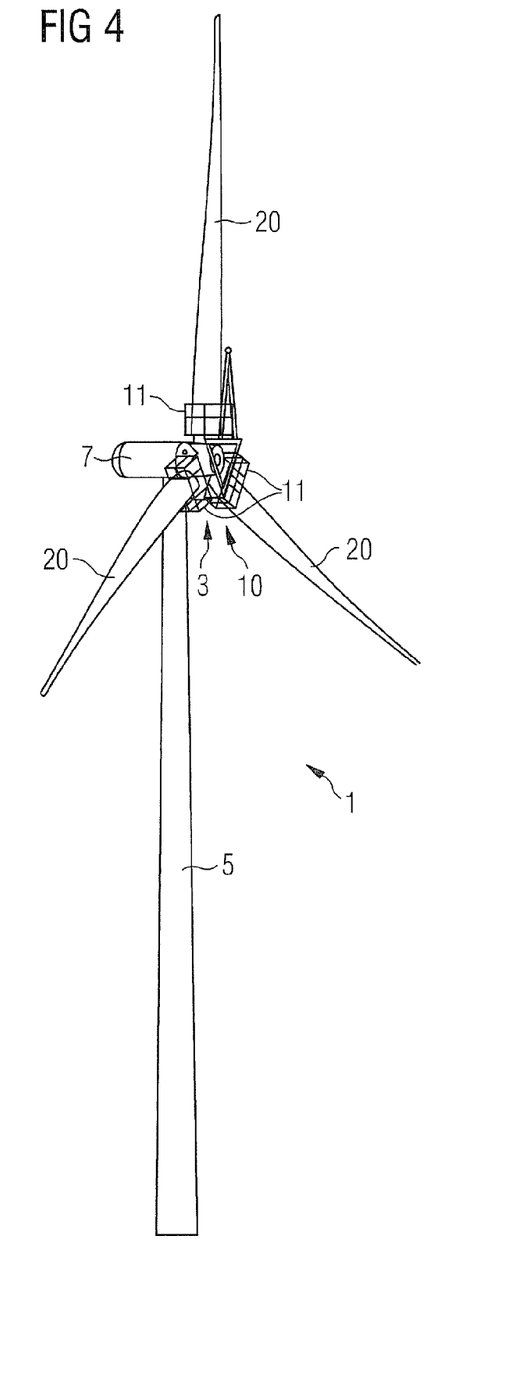
FIG. 4 shows the wind turbine of FIG. 3 with the assembly in a third position.

FIG. 4 shows the wind turbine 1 with the assembly 10 in a third position. The crane 40 is left out in this drawing for mere reasons of clarity. The third position is defined by the fact that all blade retaining elements 11 have now been pivoted around the axes of their hinges so that the blades 20 are all in an assembly position which directly reflects their final position within the hub 30. That means that they have been brought into a vertical position which directly corresponds with their position in the hub 30. They can now be mounted on the hub 30 in a way which is shown in more detail in FIGS. 5 and 6.

Figure 5:
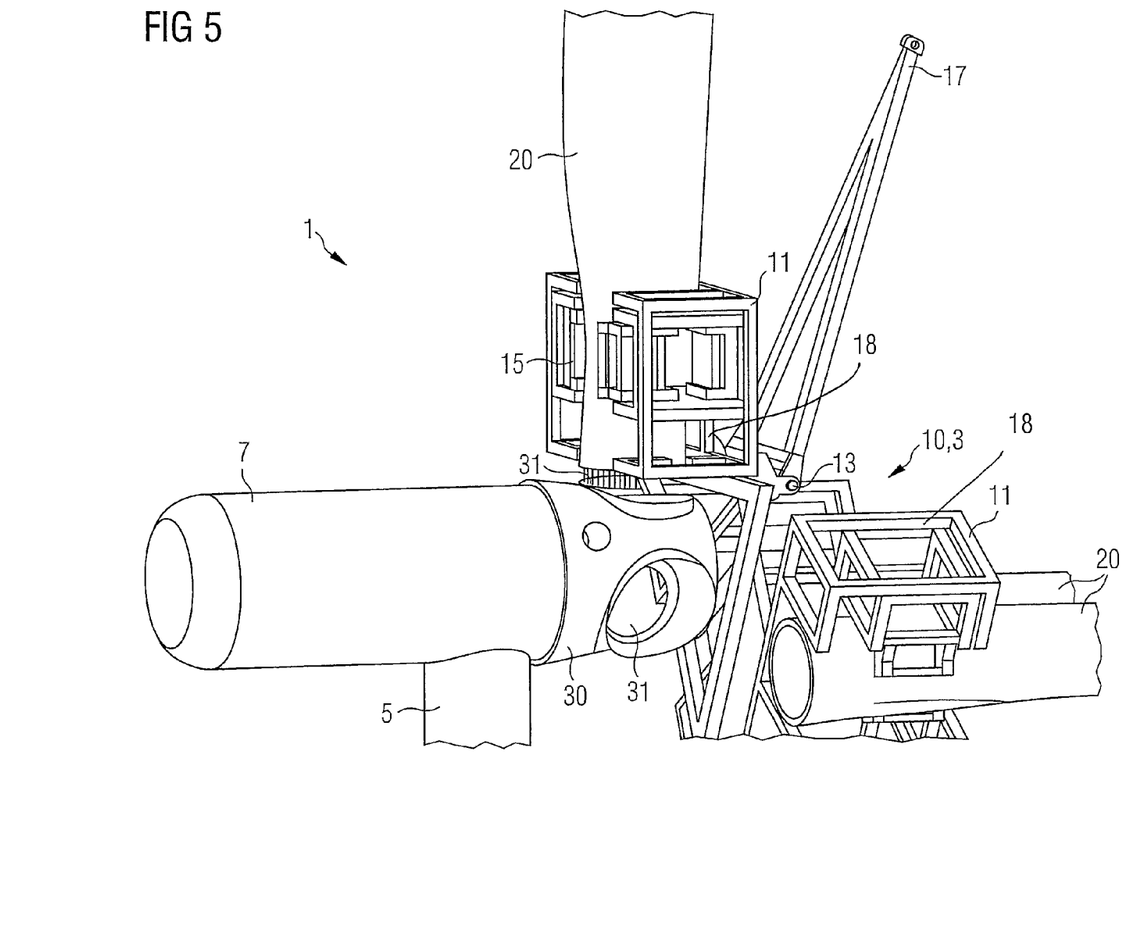
FIG. 5 shows a detailed view of FIG. 3 before mounting a blade.
Figure 6:
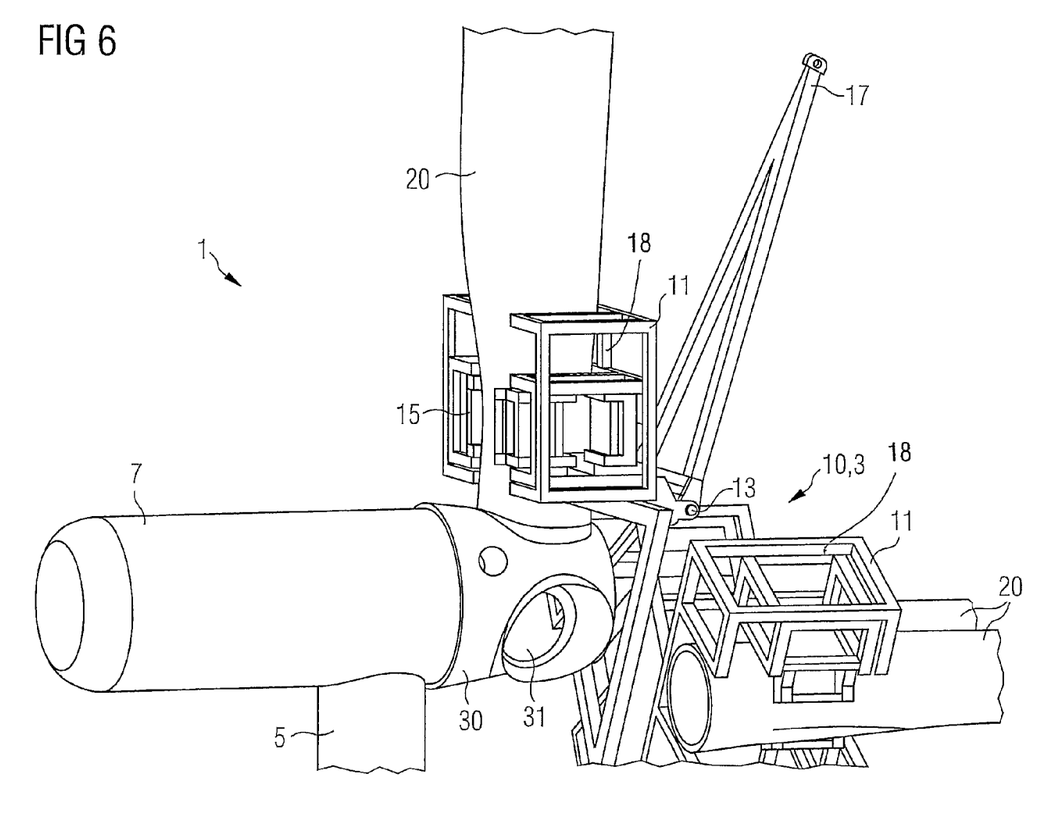
FIG. 6 shows a detailed view of FIG. 3 after mounting the blade.

FIG. 5 shows a detailed view of FIG. 3, i.e. with the assembly 10 in the second position P2. It can be seen clearer that the assembly is positioned such that the 12 o'clock blade 20 is positioned exactly above one opening 31 of the hub 30. The blade will now be lowered into that opening so that it can be affixed therein. As can be seen in FIG. 6, for this purpose the clamp 15 of the blade retaining element 11 is moved into the direction of the hub 30 so that the lower end section of the blade 20 is inserted into the opening 31.

The same can be done with the other two blades 20. It may also be noted that once a first blade 20 is affixed to the hub 30, there is a connection between the assembly 10 and the hub during all the rest of the time of the mounting process. After all blades 20 have been mounted in the same way as described in detail before, the blade retaining elements 11 can be opened and thus the blades 20 will be released. The assembly 20 can be driven away by the crane 40 and reused for mounting the next set of blades.

The embodiment of the invention as described with reference to the figures realizes a particular feature of the invention, namely that the hub 30 is not turned or moved during the mounting process. Therefore, no actors such as motors or the like are used to change the rotation position of the hub 30. This is particularly helpful particularly in those cases in which a so-called direct drive wind turbine is assembled. In these cases the drive train connecting the hub to the generator in the nacelle is particularly heavy and thus difficult to move.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An assembly for mounting wind turbine blades to a wind turbine hub, the assembly comprising:
    a frame; and
    a blade retaining arrangement comprising a plurality of cage shaped blade retaining elements each pivotally connected to the frame by a hinge,
    each blade retaining element further comprises a clamp,
    wherein at least two blade retaining elements cooperate to repositionably hold a turbine blade during the mounting process.

2. The assembly according to claim 1,
    wherein each of the blade retaining elements is detachably attached to the turbine blade.

3. The assembly according to claim 2,
    wherein the clamps are repositioned by at least one actuation selected from the group consisting of mechanical actuation, electrical actuation and hydraulic actuation.

4. The assembly according to claim 2,
    wherein at least one of the plurality of blade retaining elements further comprises a guiding means for guiding at least one of the plurality of blades towards the hub,
    wherein the guide means comprises slide bearings for repositioning at least one of the plurality of blades by repositioning the clamp.

5. The assembly according to claim 2,
    wherein at least one of the blade retaining elements is pivotable between a first position and a second position relative to the assembly.

6. The assembly according to claim 5,
    wherein the first position of at least one of the blade retaining elements corresponds to a horizontal position of a blade held in the blade retaining element.

7. The assembly according to claim 5,
    wherein the second position of at least one of the blade retaining elements corresponds to a vertical position of a blade held in the blade retaining element.

8. A system for mounting wind turbine blades to a wind turbine hub, comprising:
    an assembly according to claim 1; and
    a lifting device for lifting the assembly to the wind turbine hub.

9. A method for mounting wind turbine blades to a wind turbine hub positioned in a designated operating height of a wind turbine, the method comprising:
    attaching at least two blades to a blade retaining arrangement of an assembly, each blade retaining arrangement comprising a plurality of cage shaped blade retaining elements which cooperate to hold the turbine blade,
    wherein each cage shaped blade retaining element is pivotally connected to a frame of the blade retaining arrangement;
    lifting the assembly with the blades to the wind turbine hub using a lifting device; and
    mounting the blades on the lifted assembly to the wind turbine hub by repositioning the cage shaped blade retaining elements.

10. The method according to claim 9, wherein each blade is detachably attached to a blade retaining element of the blade retaining arrangement.

11. The method according to claim 9, wherein a plurality of blade retaining elements are connected to each other via a hinge, the method further comprising:
    attaching each blade to a blade retaining element;
    lifting the assembly to the wind turbine hub using a lifting device;
    pivoting the blade retaining element from a first position to a second position;
    guiding the blades towards the hub;
    mounting the blades to the hub.

12. The method according to claim 11, wherein pivoting the blade retaining element from the first position to the second position precedes the lifting the assembly to the wind turbine hub.

13. The method according to claim 11,
    wherein the first position of the blade retaining element corresponds to a horizontal position of a blade held in the blade retaining element.

14. The method according to claim 13,
    wherein the second position of the blade retaining element corresponds to a vertical position of a blade held in the blade retaining element.

* * * * *